(12) United States Patent
Yasuda

(10) Patent No.: US 6,324,343 B1
(45) Date of Patent: *Nov. 27, 2001

(54) OPTICAL APPARATUS

(75) Inventor: Toshiyuki Yasuda, Ohmiya (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/420,405

(22) Filed: Oct. 18, 1999

(30) Foreign Application Priority Data

Oct. 22, 1998 (JP) .................................................. 10-301487

(51) Int. Cl.$^7$ .................................................. G03B 17/00
(52) U.S. Cl. .............................................................. 396/87
(58) Field of Search ................................. 396/85, 86, 87, 396/79, 72

(56) References Cited

U.S. PATENT DOCUMENTS 5,905,918 * 5/1999 Nakamura et al. ..................... 396/87

* cited by examiner

Primary Examiner—W. B. Perkey
(74) Attorney, Agent, or Firm—Robin, Blecker & Daley

(57) ABSTRACT

An apparatus, such as an image pickup apparatus, includes an optical unit a moving direction of which changes from one of a drawing-out direction and a drawing-in direction to the other of the drawing-out direction and the drawing-in direction in process of varying a focal length from one of a shortest focal length end and a longest focal length end to the other of the shortest focal length end and the longest focal length end, the optical unit having possibility of receiving an external force in the drawing-in direction, a driving device which drives the optical unit, and a control device which controls the driving device. When the optical unit is determined to move in the drawing-in direction to reach a stop position on the basis of a position of the optical unit and a direction of varying the focal length, the control device controls and causes the driving device to move the optical unit in the drawing-out direction after moving the optical unit in the drawing-in direction beyond the stop position and, then, to stop the optical unit at the stop position.

32 Claims, 10 Drawing Sheets

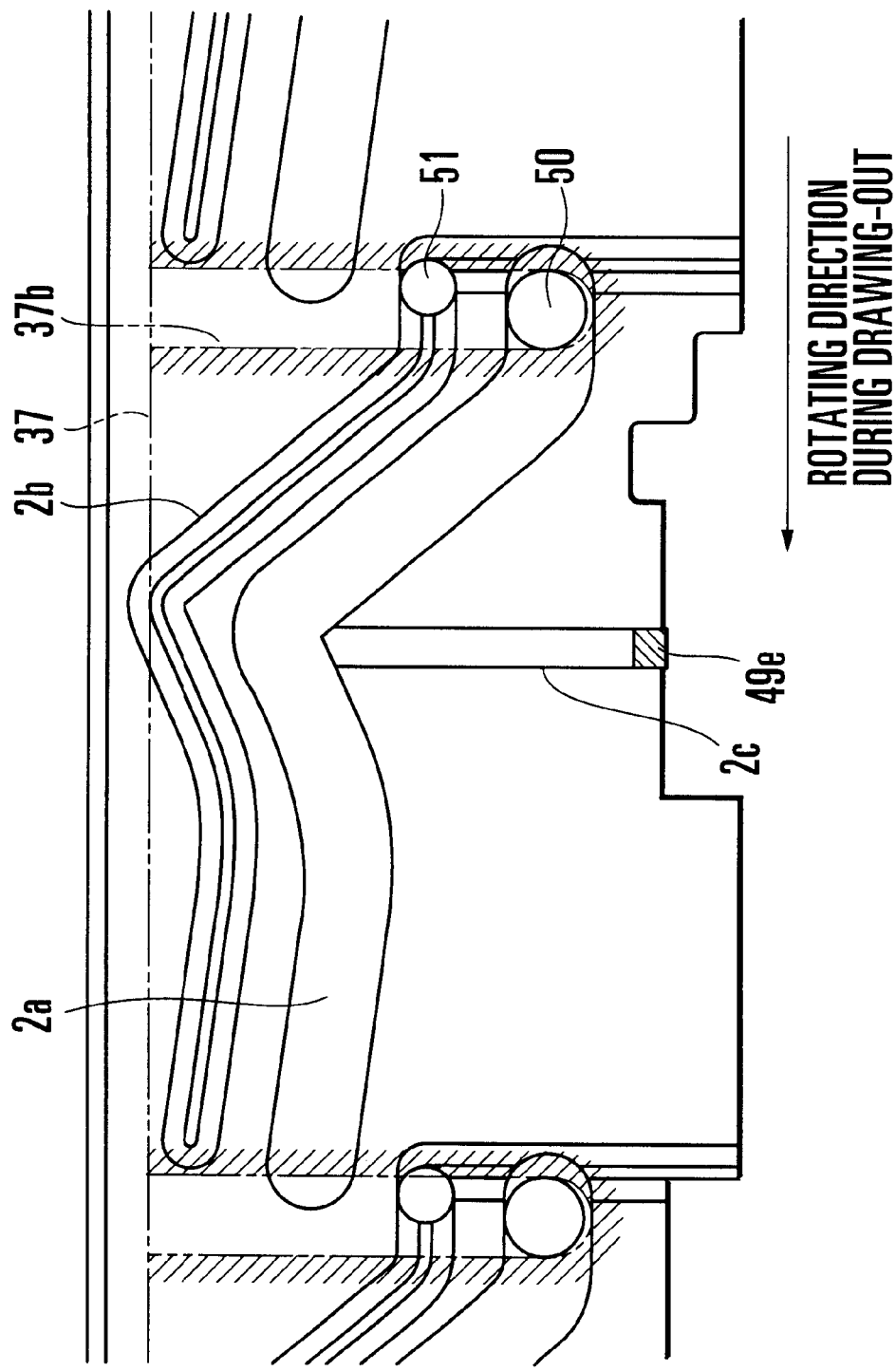

OPTICAL APPARATUS

BACKGROUND OF THE INVENTION

1. Field of the Invention

The present invention relates to an optical apparatus, such as a camera, which performs the drawing-out and drawing-in of an optical unit.

2. Description of Related Art

Heretofore, in zoom lens cameras capable of performing a zooming action, a cam ring is used as a means for driving a lens to perform the zooming action. A cam groove provided in the cam ring is formed, for example, in the shape as shown in FIG. 10(a). In FIG. 10(a), the cam groove 101 in the cam ring 100 is provided for driving a variator lens. A cam pin provided on a lens barrel holding the variator lens is fitted in the cam groove 101 and the lens barrel is arranged to move between a stowage position where the lens barrel is stowed within a camera body and a telephoto end position, according to the rotation of the cam ring 100. Incidentally, when the lens barrel is in the stowage position, a barrier (not shown) provided on the front end portion of the lens barrel is closed to protect the lens.

In the conventional zoom mechanism as described above, there is provided such a cam groove as to cause the variator lens to be drawn out monotonously (without being drawn in on its way) during the zooming action from the wide-angle side to the telephoto side and to be drawn in monotonously (without being drawn out on its way) during the zooming action from the telephoto side to the wide-angle side, and the lens barrel holding the variator lens is driven by a DC motor, serving as a zoom motor, and a train of gears so as to be moved in the optical axis direction.

In the meantime, there exists backlash in a train of gears. Specifically, when the lens barrel holding the variator lens is driven from the wide-angle side to the telephoto side, the backlash exists on the telephoto side. On the other hand, when the lens barrel holding the variator lens is driven from the telephoto side to the wide-angle side, the backlash exists on the wide-angle side.

In order to cause the lens barrel holding the variator lens to stop always at the same zoom position regardless of whether the zooming operation is performed by an operator from the telephoto side to the wide-angle side or from the wide-angle side to the telephoto side, it becomes necessary to perform a biasing operation for eliminating backlash.

A problem might arise in a case where the lens barrel is driven from the telephoto side, i.e., the position where the lens barrel protrudes from the camera body at the full length, to the wide-angle side, i.e., the position where the lens barrel is drawn within the camera body. In such a case, if the lens barrel happens to come into contact with an obstacle, or if the operator erroneously pushes in the lens barrel, exerting an external force on the lens barrel, the lens barrel would be pushed in as much as the backlash, so that the photo-taking magnification is caused to change.

In view of the above points of view, there has been proposed a camera in which, when zooming is effected from the telephoto side to the wide-angle side, a biasing operation, i.e., the operation of drawing in the lens barrel further by an extra amount from the position desired by the operator and, after that, drawing out the lens barrel, is performed to eliminate the backlash of a train of gears, so that the lens barrel can be stopped at the stop position desired by the operator, thereby solving the above conveniences.

On the other hand, there is another zoom mechanism in which, as shown in FIG. 10(b), an extreme value is set between the wide-angle end and the telephoto end in a cam groove 201 provided in a cam ring 200. In that zoom mechanism, when advancing from the wide-angle end to the telephoto end, the lens is moved toward the image side before reaching the extreme value, and is moved toward the object side after passing the extreme value.

In the above zoom mechanism, assuming that the zooming action is stopped between the wide-angle end and the extreme value during the process of zooming toward the telephoto end (herein, the rotating direction of a gear at this time is referred to as the normal rotating direction), the backlash occurring in a train of gears for driving the cam ring 200 is considered to exist on the side in the normal rotating direction. Then, since, in such a stop position, the direction in which the lens barrel advances toward the extreme value is the abovementioned normal rotating direction, if any external force is exerted on the lens barrel, the lens barrel would be drawn in, so that the photo-taking magnification is caused to change.

In order to remove such inconveniences, it is necessary to perform the biasing operation. However, since, in the conventional method, the biasing operation is performed only when the lens barrel is moved from the telephoto side to the wide-angle side, the biasing operation is not performed in a case where the lens barrel is moved from the wide-angle side to the telephoto side. Therefore, there is the possibility that, if the lens barrel happens to come into contact with an obstacle, or if the operator erroneously pushes in the lens barrel, exerting an external force on the lens barrel, the lens barrel would be pushed in slightly, so that the photo-taking magnification is caused to change.

BRIEF SUMMARY OF THE INVENTION

In accordance with one aspect of the invention, there is provided an apparatus, such as an image pickup apparatus, comprising an optical unit a moving direction of which changes from one of a drawing-out direction and a drawing-in direction to the other of the drawing-out direction and the drawing-in direction in process of varying a focal length from one of a shortest focal length end and a longest focal length end to the other of the shortest focal length end and the longest focal length end, the optical unit having possibility of receiving an external force in the drawing-in direction, a driving device which drives the optical unit, and a control device which controls the driving device, the control device, when the optical unit is determined to move in the drawing-in direction to reach a stop position on the basis of a position of the optical unit and a direction of varying the focal length, controlling and causing the driving device to move the optical unit in the drawing-out direction after moving the optical unit in the drawing-in direction beyond the stop position and, then, to stop the optical unit at the stop position, so that the optical unit can be prevented from being moved by an external force due to backlash, regardless of a stop position of the optical unit.

The above and other aspects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 6 is a development view showing the inner side of the fixed tube shown in FIG. 1.

DETAILED DESCRIPTION OF THE INVENTION

Hereinafter, a preferred embodiment of the invention will be described in detail with reference to the drawings.

Figure 1:
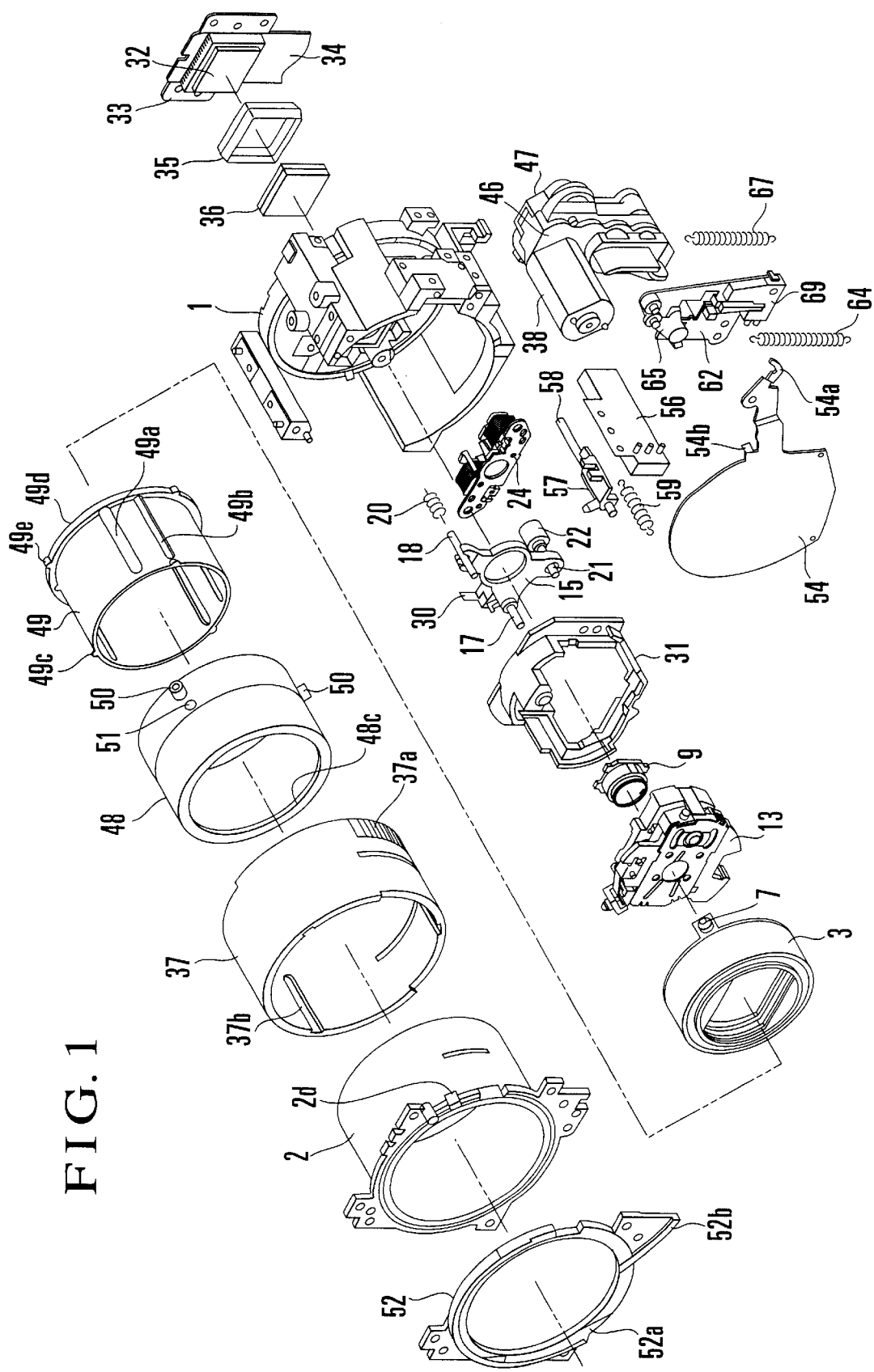
FIG. 1 is an exploded perspective view showing a zoom lens barrel of a camera according to an embodiment of the invention.

Among FIGS. 1 to 9, which show the embodiment of the invention, FIG. 1 is an exploded perspective view showing a lens barrel part of a camera according to the embodiment of the invention.

Referring to FIG. 1, a base 1 serving as a base part of a lens barrel unit constitutes a structural body of the lens barrel unit in conjunction with a fixed tube 2 which is secured to the front end of the base 1 with screws. A first-lens-group tube 3 holds a plurality of lenses (not shown). Three follower pins 7 which have tapered fore end parts are press-fitted into the outer circumferential side surface of the first-lens-group tube 3. A cap (not shown) is secured by bonding to the front surface of the first-lens-group tube 3.

A second-lens-group tube 9, which holds a plurality of lenses (not shown), is secured by bonding to a diaphragm base plate of a diaphragm unit 13 integrally therewith.

A third-lens-group tube 15, which holds a lens, is arranged to be guided by guide bars 17 and 18 which extend in the optical axis direction, to have its axial position restricted by a nut (not shown) having a female thread pinched by the arm part of the third-lens-group tube 15 and arranged to engage a screw 21, and to be in a state of being biased by a tension spring 20 in the drawing-in direction of the lens barrel. Further, a projection which is provided on the third-lens-group tube 15 is fitted into a slit part provided on the nut in such a way as to restrict the rotating motion of the third-lens-group tube 15. The screw 21 is formed integrally with a magnet 22 to have a male thread part arranged to engage the female thread part of the nut. A bearing metal piece is press-fitted into the base 1 and has one end of the screw 21 fitted therein in a rotatable manner. A stepping motor 24 is arranged to drive and move the third-lens-group tube 15. The stepping motor 24 constitutes a magnetic circuit including the magnet 22, and is secured to the base 1. A slit plate 30 which is secured to the third-lens-group tube 15 integrally therewith is disposed in a position to be insertable and retractable into and from a slit part of a photo-interrupter (not shown), so that the position of the third-lens-group tube 15 can be detected.

An image sensor 32 is secured by bonding to a holding plate 33, which is secured to the base 1 with screws. A flexible printed circuit board 34 is arranged to supply a photoelectrically-converted image signal to a signal processing circuit which will be described later herein. A dust-proof rubber piece 35 and an optical low-pass filter (LPF) 36 are both secured by bonding to the base 1.

Figure 4:
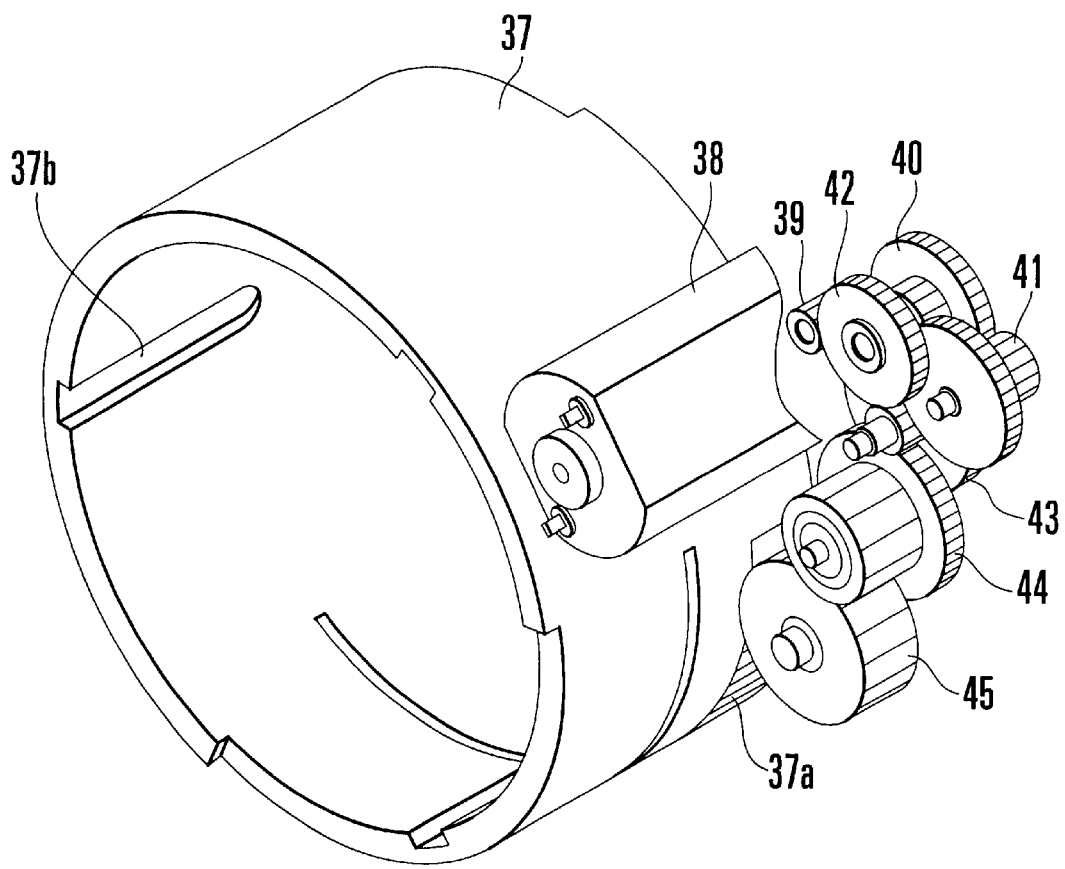
FIG. 4 is a perspective view showing a driving ring shown in FIG. 1 and a driving mechanism therefor.

A driving ring 37 is rotatably fitted on the outer (circumferential) side of the fixed tube 2. As shown in FIG. 4, the driving ring 37 has a gear part 37a formed at a part on the outer side thereof. A zoom motor 38 is arranged on the outer side of the driving ring 37 to have a pinion gear 39 firmly press-fitted to its output shaft. The driving force of the zoom motor 38 is transmitted from the pinion gear 39 to the gear part 37a of the driving ring 37 through gears 42, 41, 40, 43, 44 and 45 one after another. These gears 40 to 45 are placed in gear boxes 46 and 47 and are secured to the base 1 in that state. The zoom motor 38 is also secured to the gear box 46.

Figure 2:
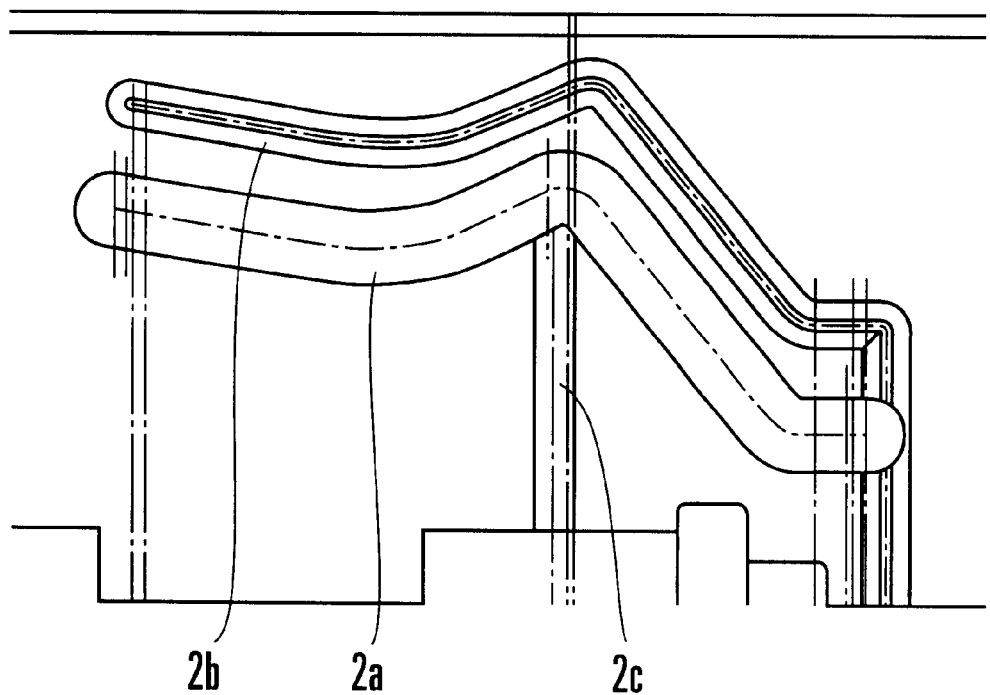
FIG. 2 is a development view of a fixed tube shown in FIG. 1.

A moving cam ring 48 is fitted in on the inner side of the fixed tube 2. A rectilinear guide tube 49 is fitted in on the inner side of the moving cam ring 48. On the outer side of the moving cam ring 48, are mounted three driving pins 50 and three follower pins 51 having tapered parts, at equal intervals. As shown in FIGS. 2 and 6, the driving pins 50 pierce through hole parts 2a of the fixed tube 2 to fittingly engage groove parts 37b which are provided on the inner side of the driving ring 37.

The follower pins 51 has their fore-end tapered parts in sliding contact with tapered cam grooves 2b which are formed on the inner side of the fixed tube 2, as shown FIG. 6. FIGS. 2 and 6 are inner circumferential-surface development views for explaining the above-described arrangement.

Two kinds of tapered cam grooves (not shown) are formed on the inner circumferential side of the moving cam ring 48. Followers 7 which are provided on the first-lens-group tube 3 and followers which are provided on the diaphragm unit 13 are in sliding contact with the two kinds of tapered cam grooves. At the same time, the side surfaces of the respective followers are fittingly engaging the rectilinear grooves 49a and 49b of the rectilinear guide tube 49, so that the positions of the respective followers in the direction of rotation are restricted.

Further, front-side projections 49c provided on the outer circumferential side of the rectilinear guide tube 49 are in contact with a groove part 48c provided on the inner circumferential side of the moving cam ring 48, and a flange part 49d of the rectilinear guide tube 49 is in contact with an end part of the moving cam ring 48. By this arrangement, the rectilinear guide tube 49 is restrained from relatively moving in the optical axis direction with respect to the moving cam ring 48. At the same time, rear-side projections 49e provided on the outer circumferential side of the rectilinear guide tube 49 are fitted in linear groove parts 2c provided on the inner circumferential side of the fixed tube 2, in such a way that the rectilinear guide tube 49 is rectilinearly movable while being restrained from moving in the rotating direction.

A cap 52 is arranged to hold a dust-proof sheet (not shown) between the fixed tube 2 and the cap 52. The cap 52 has rail parts 52a and 52b formed on a front surface thereof to guide a barrier 54 which will be described later.

A linear sensor 56, which is composed of a variable resistor, is secured to the base 1 with screws or the like. A lever 57 is arranged to pinch and carry a sliding piece of the variable resistor and to be guided by a guide bar 58. A spring 59 urges the lever 57 to move toward one side. The rotational angle of the driving ring 37 is detected by A/D-converting the terminal voltage of the linear sensor 56, so that the position of the first-lens-group tube 3 also can be detected accordingly.

Figure 3A:
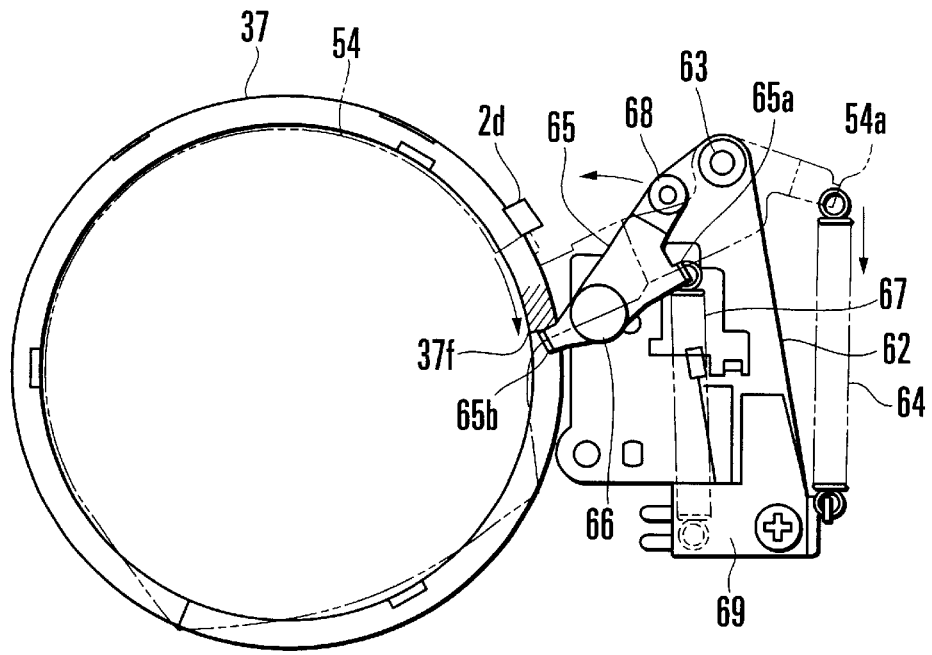
FIGS. 3(a) and 3(b) are diagrams for explaining an opening-and-closing mechanism for a barrier shown in FIG. 1, FIG. 3(a) showing the closed state of the barrier and FIG. 3(b) showing the opened state of the barrier.
Figure 3B:
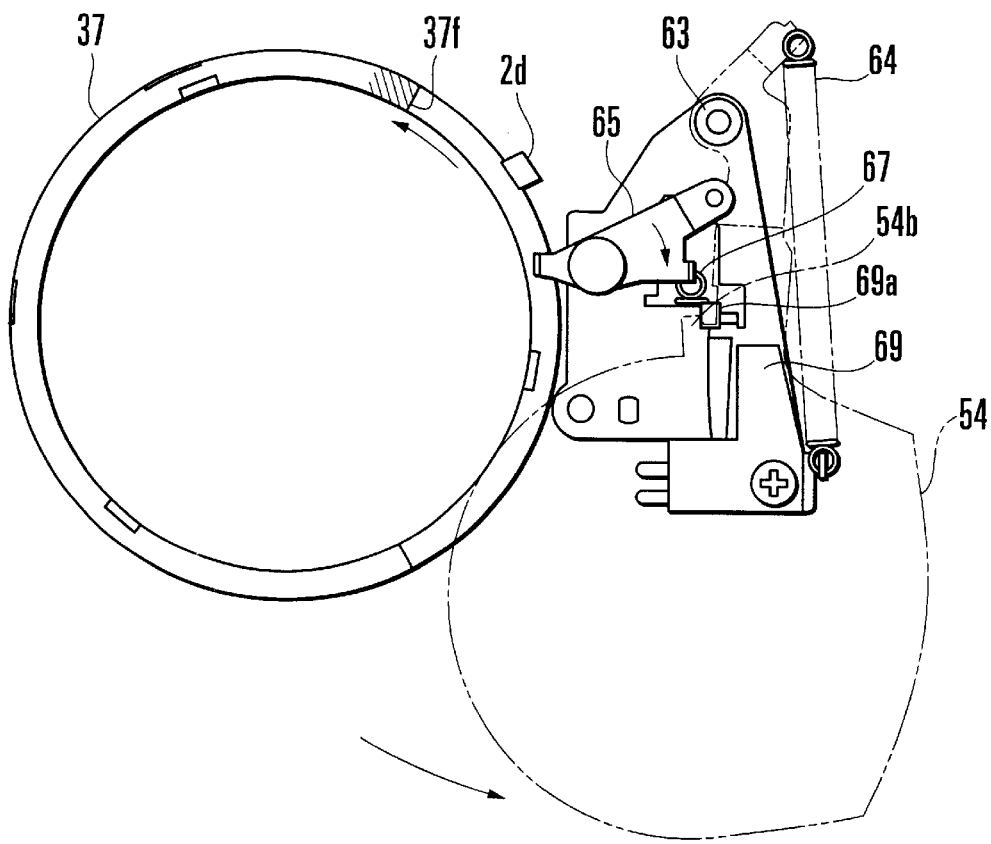

Referring to FIG. 1 and FIGS. 3(a) and 3(b), the barrier 54 is supported to be rotatable around a shaft 63 mounted on a barrier base 62. The barrier 54 is urged by a closing spring 64 hooked on its hook part 54a to move clockwise as viewed from the front of the camera.

A barrier driving lever 65 is supported to be rotatable around a shaft 66 mounted on the barrier base 62. The barrier driving lever 65 is urged to move clockwise by an opening spring 67 which is hooked on a hook part 65a of the barrier driving lever 65. Here, the urging forces of the two springs 64 and 67 are set as "the closing springs 64<<the opening spring 67".

A shaft 68 is mounted at one end of the barrier driving lever 65 in a position corresponding to one side face of the barrier 54. A leaf switch 69 which is formed by integral molding is secured to the barrier base 62 with screws. The barrier base 62 is secured to the base 1 with screws.

FIG. 3(a) shows the state where the barrier 54 is closed. In this state, a stepped part 37f of the driving ring 37 pushes a bent part 65b of the barrier driving lever 65 to cause the barrier driving lever 65 to be swung counterclockwise against the urging force of the opening spring 67 and to be locked at that position. The barrier 54 is, in the meantime, caused to swing in the direction of closing by the urging force of the closing spring 64 and to be in a closed state with its bent part 54b abutting on a stopper part 2d of the fixed tube 2.

The lens barrel of the camera arranged according to the present embodiment as described above operates as follows.

When the zoom motor 38 is driven, the driving ring 37 is caused to rotate through the gears 39 to 45. Then, the rotation of the driving ring 37 causes the moving cam ring 48 to rotate through the driving pins 50. However, since the follower pins 51 of the moving cam ring 48 are engaging the cam grooves 2b of the fixed tube 2, the moving cam ring 48 is allowed to also move in the optical axis direction along the cam grooves 2b of the fixed tube 2. The movement of the moving cam ring 48 in the optical axis direction causes the rectilinear guide tube 49 to move also in the optical axis direction integrally with the moving cam ring 48. Then, since the projections 49e on the outer circumferential side of the rectilinear guide tube 49 is under restriction of the groove parts 2c of the fixed tube 2, the rectilinear guide tube 49 is allowed to move only in the optical axis direction without rotating.

When the moving cam ring 48 rotates, the first-lens-group tube 3 and the second-lens-group tube 9 which is secured to the diaphragm unit 13 relatively move in the optical axis direction respectively along the grooves 49a and 49b of the rectilinear guide tube 49 according to the lifts of the respective cams of the moving cam ring 48.

Figure 5A:
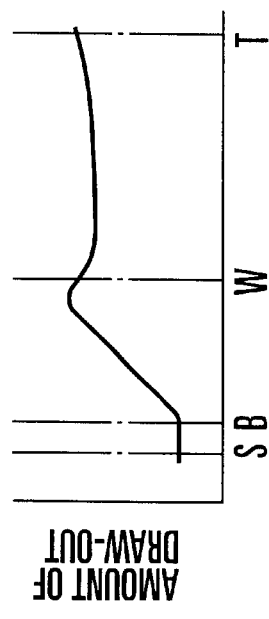
FIG. 5(a) is a diagram showing a cam locus of the fixed tube shown in FIG. 1.
Figure 5B:
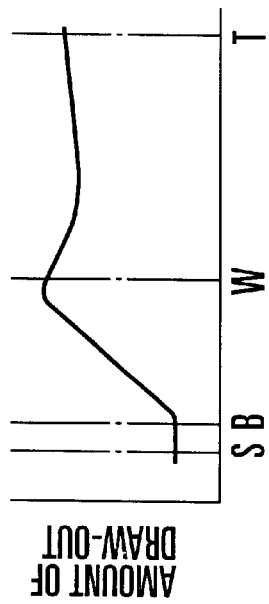
FIG. 5(b) is a diagram showing a cam locus of a moving cam ring for a first lens-group tube.
Figure 5C:
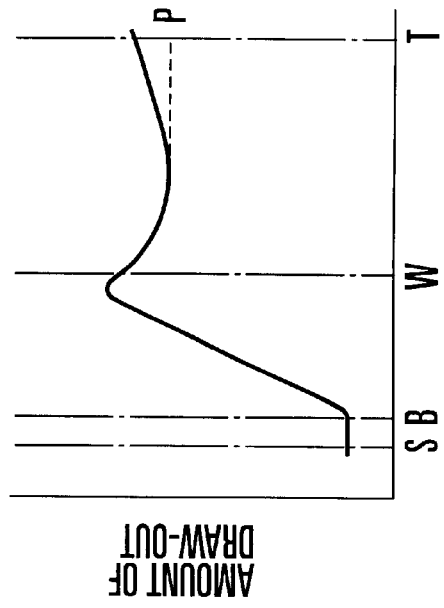
FIG. 5(c) is a diagram showing a movement locus of the first-lens-group tube which is the sum of the cam locus shown in FIG. 5(a) and the cam locus shown in FIG. 5(b).

FIGS. 5(a) to 5(c) are diagrams showing only the loci of the cam parts of the lens barrel. FIG. 5(a) shows the cam locus of the fixed tube 2. FIG. 5(b) shows the cam locus of the moving cam tube 48 for the first-lens-group tube 3. FIG. 5(c) shows the locus of movement of the first-lens-group tube 3, which is the sum of the cam loci shown in FIGS. 5(a) and 5(b). Referring to the locus of movement shown in FIG. 5(c), the first-lens-group tube 3 is driven in the drawing-in direction and in the drawing-out direction with the boundary set to the position of an extreme value between the wide-angle end and the telephoto end.

In each of FIGS. 5(a) to 5(c), a point W represents a wide-angle end position, a point T represents a telephoto end position, and a point S represents a stowage position. Each cam is provided with a flat area extending from the stowage position S to a position B.

According to the loci shown in FIGS. 5(a) to 5(c), a change-over between the stowage position and a photo-taking position (S–W) and a zooming action in the photo-taking range (W–T) are carried out by driving the zoom motor 38.

When the driving ring 37 rotates, the lever 57 moves along a cam groove (not shown) in the optical axis direction to displace the sliding piece of the linear sensor 56 and thus to vary the output of the linear sensor 56. Thus, by detecting the output of the liner sensor 56, every zoom position is successively detectable and the position of the extreme value is also detectable.

As mentioned in the foregoing, the stepped part 37f of the driving ring 37 locks the barrier driving lever 65 when the lens barrel is in the stowage position. However, when the driving ring 37 rotates, the barrier driving lever 65 is unlocked to allow the barrier driving lever 65 to be swung clockwise by the urging force of the opening spring 67. The barrier driving lever 65 thus comes to push the side surface of the barrier 54 through the shaft 68.

Since the urging force of the closing spring 64 is weaker than the urging force of the opening spring 67 as mentioned above, the barrier 54 is caused to be swung counterclockwise by the barrier driving lever 65 into an opened position as shown in FIG. 3(b). At this time, if no external force is exerted on the barrier driving lever 65, the L-shaped bent part 54b of the barrier 54 pushes a contact 69a of the leaf switch 69 to turn on the leaf switch 69. Therefore, it is possible to electrically detect the state in which the barrier 54 is opened.

However, when the lens barrel is in the stowage position, i.e., when the camera is not in the photo-taking state, the stepped part 37f of the driving ring 37 acts on the bent part 65b of the barrier lever 65 to move the bent part 65b downward. At this time, the barrier 54 is closed by the action of the closing spring 64.

The opening and closing actions on the barrier 54 are thus arranged to be carried out within the flat areas of the cam loci, i.e., between the positions S and B, shown in FIGS. 5(a) to 5(c).

Figure 8:
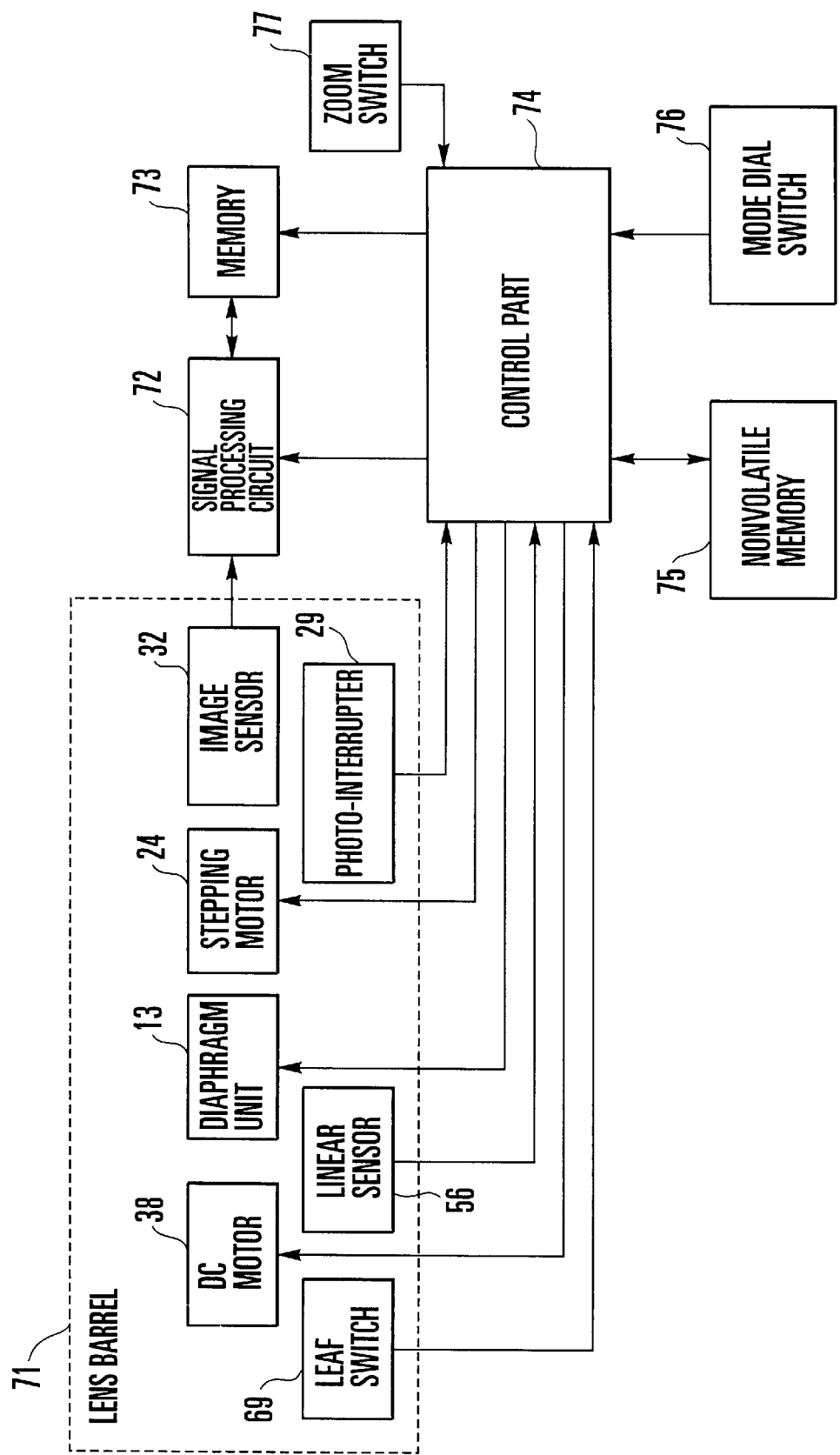
FIG. 8 is a block diagram showing the electrical arrangement for controlling the lens barrel shown in FIG. 1.

FIG. 8 is a block diagram showing the electrical arrangement for driving the lens barrel according to the embodiment of the invention.

In FIG. 8, the lens barrel 71 is the same as the lens barrel that has been described above, and the components of the lens barrel 71 are indicated by the same reference numerals as those used in the foregoing description.

Referring to FIG. 8, an image signal obtained through photoelectric conversion by the image sensor 32 is supplied to a signal processing circuit 72 for a color-conversion process, a gamma correction process, etc. After these processes, the image signal is recorded in a memory 73 which is, for example, a card medium or the like. A control part 74, which controls the whole camera, is arranged to control the stepping motor 24, the zoom motor 38 and the diaphragm unit 13 while watching the outputs of the linear sensor 56, the photo-interrupter 29, the leaf switch 69, etc., which are disposed within the lens barrel 71, and also to control the signal processing circuit 72 and the memory 73. A nonvolatile memory 75, which is, for example, an EEPROM or the like, is arranged to permit electrical erasure and recording. A mode dial switch 76 is arranged to permit selection and setting of various operation modes, such as turning-off of the power supply, a photo-taking mode, a reproduction mode, a PC (personal computer) connection mode, etc. A zoom switch 77 is arranged to output signals indicative of the direction of varying magnification, i.e., a direction toward the telephoto end or a direction toward the wide-angle end. According to the output signals of the zoom switch 77, the zoom motor 38 is driven to make a normal rotation or a reverse rotation.

The operation of the camera as described above is shown in the flow chart of FIG. 7.

Figure 7:
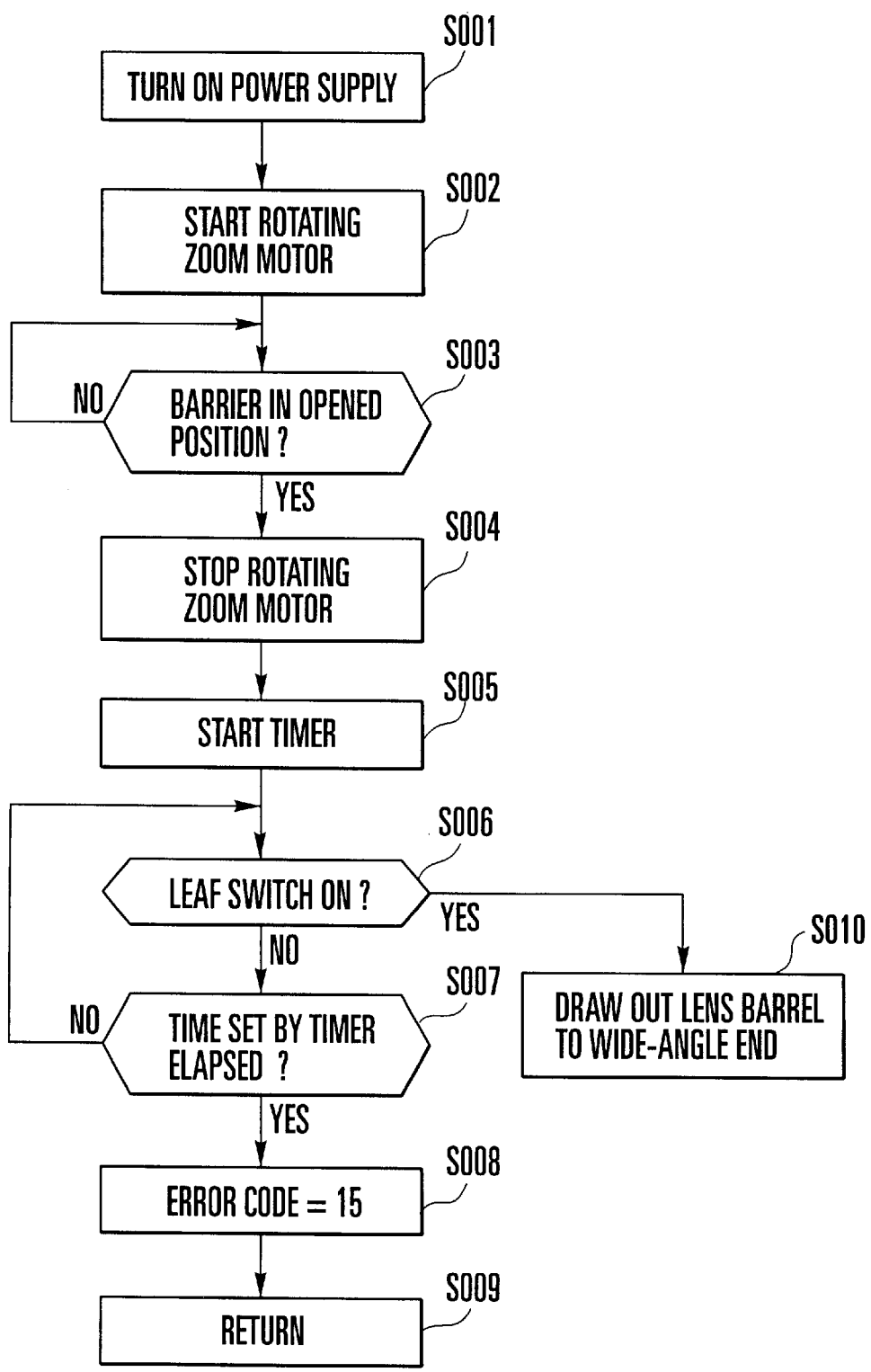
FIG. 7 is a flow chart showing the opening operation of the barrier shown in FIG. 1.

Referring to the flow chart of FIG. 7, when a power supply is turned on in step S001, the zoom motor 38 makes a normal rotation in step S002. The rotation of the zoom motor 38 is transmitted to the gear 37a of the driving gear 37 through the gears 39 to 45, so that the driving gear 37 is made to rotate counterclockwise as viewed in FIG. 4.

In step S003, a check is made to find if the barrier 54 is in the opened position. The opened position of the barrier 54 is decided according to the rotational angle of the driving ring 37, and the rotational angle of the driving ring 37 is detectable by the linear sensor 56. When the driving ring 37 has rotated up to the opened position of the barrier 54, the barrier driving lever 65 rotates clockwise, as viewed in FIG. 1, by the action of the opening spring 67, so that the shaft 68 of the barrier driving lever 65 pushes down the barrier 54 to bring the barrier 54 into the opened state as shown in FIG. 3(b).

At this point of time, the zoom motor 38 is stopped in step S004. In step S005, a timer in which a predetermined time is set is started.

In step S006, a check is made to find if the leaf switch 69 is in an on-state, i.e., if the barrier 54 has been completely opened.

When the barrier 54 comes into the completely-opened state, the bent part 54b of the barrier 54 pushes the contact 69a of the leaf switch 69, thereby turning on the leaf switch 69. If the leaf switch 69 is not in the on-state, the flow proceeds to step S007. In step S007, a check is made to find if the time set in the timer in step S005 has elapsed. If not, the flow returns to step S006, repeating the above operation until the leaf switch 69 is turned on within the predetermined time set in the timer, i.e., waiting until the barrier 54 is completely opened.

If it is not detected in step S007 that the barrier 54 has been completely opened within the predetermined time set in the timer, assuming that an error has occurred in the opening operation of the barrier 54, an error code (for example, code "15" indicative of the error of the opening operation of the barrier 54) is set to perform an error processing operation.

Figure 10A:
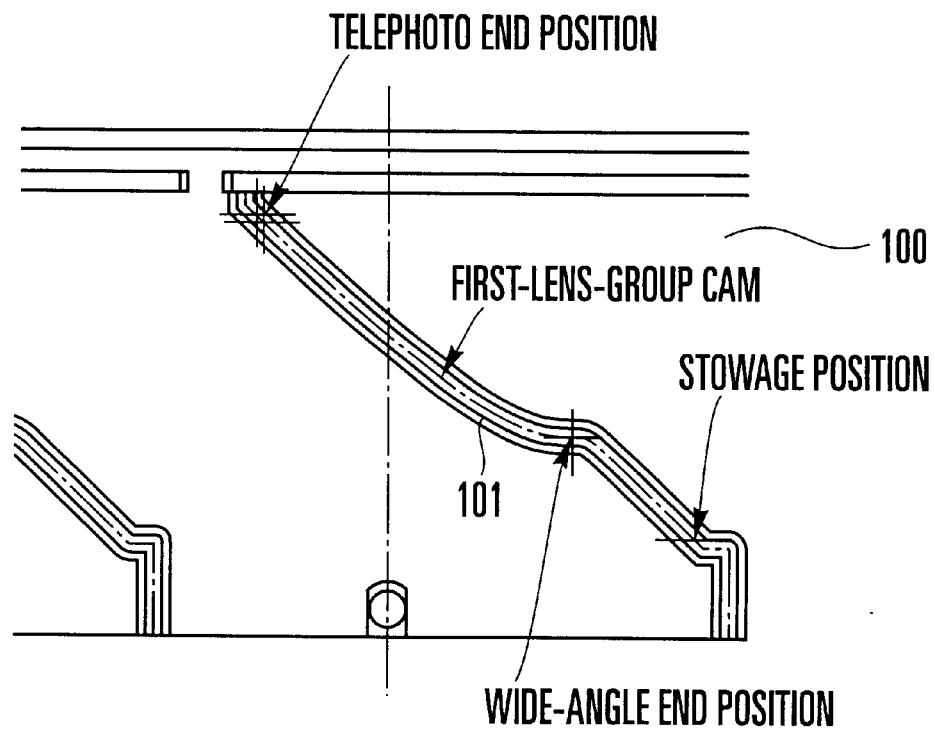
FIG. 10(a) is a development view showing a cam groove of a moving cam ring of a conventional zoom lens barrel.
Figure 10B:
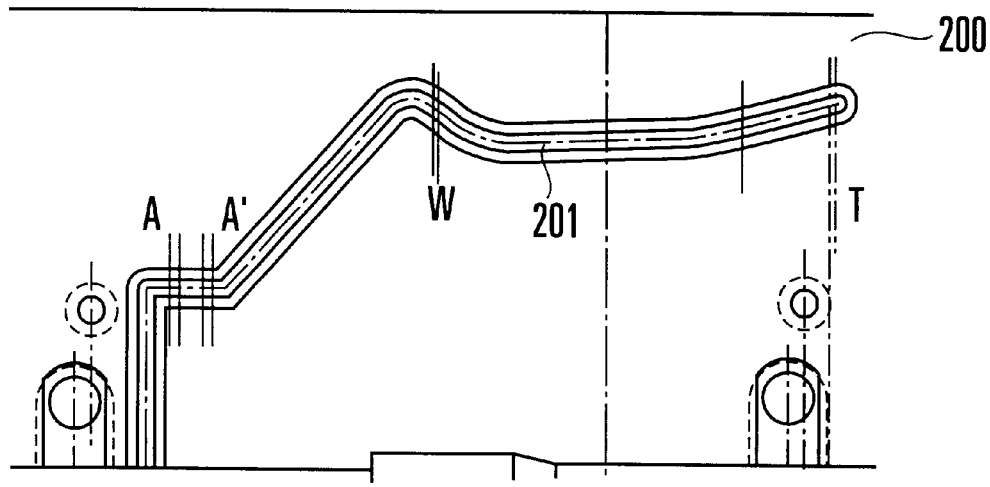
FIG. 10(b) is a development view showing a cam groove of a moving cam ring to which the invention is applied.

Incidentally, from the start of rotation of the driving ring 37 in response to the turning-on of the power supply until the barrier 54 is opened, the follower 7 of the first-lens-group tube 3 is moving on a section A–A' of the cam groove 201 shown in FIG. 10(b). Therefore, during that period, the first-lens-group tube 3 is made not to be drawn out.

Accordingly, since the rotation of the zoom motor 38 is stopped in the section A–A', even if an error occurs in the barrier opening operation, the first-lens-group tube 3 is prevented from being drawn out to collide with the barrier 54.

On the other hand, if it is detected that the leaf switch 69 has been turned on within the predetermined time set in the timer and the barrier 54 has been completely opened, the flow proceeds to step S010.

In step S010, with the on-state of the leaf switch 69 detected, the driving ring 37 is again rotated by the zoom motor 38. Accordingly, the moving cam ring 48 is rotated and is also moved in the optical axis direction along the cam groove 2b provided on the inner side of the fixed tube 2.

Further, according to the rotation of the moving cam ring 48, the first-lens-group tube 3 is moved along the cam groove 48a provided on the inner side of the moving cam groove 48. When the first-lens-group tube 3 is drawn out up to the wide-angle end position W shown in FIG. 5(c), a photo-taking operation becomes possible. The moved position of the first-lens-group tube 3 is recognized on the basis of the detection information of the linear sensor 56. When the first-lens-group tube 3 reaches the wide-angle end position W, the driving of the zoom motor 38 is stopped.

According to the present embodiment, the first-lens-group tube 3 is once driven from the stowage position to the barrier opening position in response to the turning-on of the power supply. Then, after it is confirmed that the barrier 54 has been completely opened, the first-lens-group tube 3 is driven up to the wide-angle end position. Therefore, the first-lens-group tube 3 is prevented from colliding with the barrier 54.

After that, when the operator performs a zooming operation, the zoom motor 38 rotates and the driving cam 37 rotates, so that the variator lens is moved to vary the photo-taking magnification. Accordingly, the operator can select a desired zoom position.

In addition, A/D-converted values of the terminal voltages of the linear sensor 56 corresponding to the respective positions, the respective zoom positions and the extreme value of the first-lens-group tube 3 are beforehand stored in the nonvolatile memory 75. The position of the first-lens-group tube 3 can be electrically detected by reading such A/D-converted values of the linear sensor 56 from the nonvolatile memory 75.

Next, the zooming action of the camera according to the embodiment of the invention will be described with reference to the flow chart of FIG. 9.

The characteristic feature of the zooming action resides in that, in a case where the first-lens-group tube 3 stops before reaching the extreme value P in process of moving from the wide-angle side to the telephoto side, and in a case where the first-lens-group tube 3 stops before reaching the extreme value P in process of moving from the telephoto side to the wide-angle side, because the backlash of the zoom gear train (39–45) exists on the side in the direction of drawing in the first-lens-group tube 3, a biasing operation is made to be performed. The biasing operation is performed by driving the driving ring 37 toward the telephoto side from a target stop position extra as much as a predetermined amount to draw in the first-lens-group tube 3 and, after that, reversing the driving direction of the driving ring 37 and then stopping the first-lens-group tube 3 at the target stop position. As a result, the backlash of the gear train (39–45) is eliminated, so that, even if an external force is exerted on the first-lens-group tube 3 in the drawing-in direction, the first-lens-group tube 3 is prevented from moving.

Further, in a case where, during the zooming action from the telephoto side to the wide-angle side, the zooming action is stopped on the telephoto side of the extreme value provided between the wide-angle end and the telephoto end, because the backlash of the gear train (39–45) exists on the side in the direction of drawing in the first-lens-group tube 3, a biasing operation is also performed. In this case, the biasing operation is performed by driving the driving ring 37 toward the wide-angle side from a target stop position extra as much as a predetermined amount to draw in the first-lens-group tube 3 and, after that, reversing the driving direction of the driving ring 37 and then stopping the first-lens-group tube 3 at the target stop position.

On the other hand, in a case where, during the zooming action from the wide-angle side to the telephoto side, the zooming action is stopped on the telephoto side of the extreme value provided between the wide-angle end and the telephoto end, because the backlash of the gear train (39–45) exists on the side in the direction of drawing out the first-lens-group tube 3, a biasing operation is unnecessary.

Further, in a case where, during the zooming action from the telephoto side to the wide-angle side, the zooming action is stopped on the wide-angle side of the extreme value provided between the wide-angle end and the telephoto end, because the backlash of the gear train (39–45) exists on the side in the direction of drawing out the first-lens-group tube 3, a biasing operation is also unnecessary.

Figure 9:
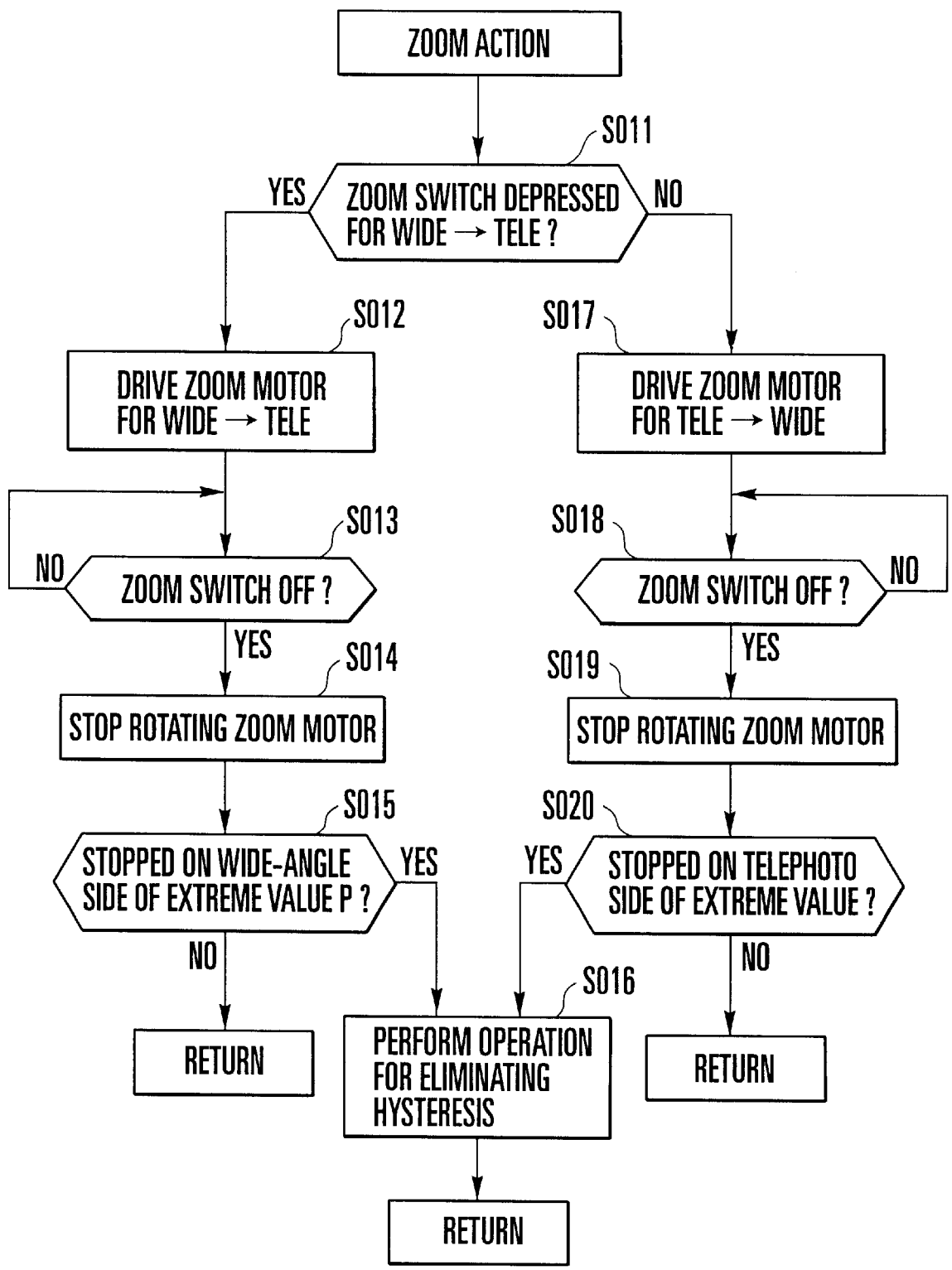
FIG. 9 is a flow chart showing the zooming action to be performed by a control part shown in FIG. 8.

In the flow chart shown in FIG. 9, with the zooming action started, a check is made in step S011 to find if a telephoto switch T (not shown) of the zoom switch 77 for indicating the zooming action from the wide-angle side to the telephoto side is turned on or a wide-angle switch W (not shown) of the zoom switch 77 for indicating the zooming action from the telephoto side to the wide-angle side is turned on. If the telephoto switch T is turned on, the flow proceeds to step S012. If the wide-angle switch W is turned on, the flow proceeds to step S017.

In step S012, the zoom motor 38 is driven to make a normal rotation so as to move the zoom lens toward the telephoto side. When the zoom motor 38 makes the normal rotation, the first-lens-group tube 3 moves in the drawing-in direction toward the extreme value P, as shown in FIG. 5(c). Then, in step S013, a check is made to find if the zoom switch 77 is turned off. If not, the zoom motor 38 remains driven in the same direction. If so, the flow proceeds to step S014. In step S014, the driving of the zoom motor 38 is stopped to stop the first-lens-group tube 3 and the second-lens-group tube 9 at the respective positions.

The position of the first-lens-group tube 3 is detected, as described in the foregoing, by the linear sensor 56 according to the rotational angle of the driving ring 37. Accordingly, in step S015, a check is made to find if the stop position in the step S014 is between the wide-angle end and the extreme value P.

If the stop position of the first-lens-group tube 3 is found in step S015 to be between the extreme value P and the telephoto end during the driving from the wide-angle end to the telephoto end, the biasing operation for eliminating backlash is unnecessary, as described above. However, if the stop position of the first-lens-group tube 3 is found in step S015 to be between the wide-angle end and the extreme value P during the driving from the wide-angle end to the telephoto end, the biasing operation for eliminating backlash (the operation for eliminating hysteresis) is necessary, as described above, so that the flow proceeds to step S016.

In step S016, the biasing operation for eliminating hysteresis in the zoom driving from the wide-angle end to the telephoto end. Since the backlash of the gear train (39–45) exists on the side in the direction of drawing in the first-lens-group tube 3, the biasing operation is performed by driving the driving ring 37 toward the telephoto side (in the drawing-in direction) from a target stop position extra as much as a predetermined amount to draw in the first-lens-group tube 3 and, after that, causing the zoom motor 38 to rotate in the reverse direction and then stopping the first-lens-group tube 3 at the target stop position. Thus, as the stop position of the first-lens-group tube 3 obtained when the zoom switch 77 is turned off is stored, the first-lens-group tube 3 is made to be returned to the stop position as stored.

As a result, the backlash of the gear train (39–45) is eliminated, so that, even if an external force is exerted on the first-lens-group tube 3 in the drawing-in direction, the first-lens-group tube 3 is prevented from moving.

On the other hand, in step S017, the zoom motor 38 is driven to make a reverse rotation so as to move the zoom lens toward the wide-angle side. When the zoom motor 38 makes the reverse rotation, the first-lens-group tube 3 moves in the drawing-in direction toward the extreme value P, as shown in FIG. 5(c). Then, in step S018, a check is made to find if the zoom switch 77 is turned off. If not, the zoom motor 38 remains driven in the same direction. If so, the flow proceeds to step S014. In step S019, the driving of the zoom motor 38 is stopped to stop the first-lens-group tube 3 and the second-lens-group tube 9 at the respective positions.

The position of the first-lens-group tube 3 is detected, as described in the foregoing, by the linear sensor 56 according to the rotational angle of the driving ring 37. Accordingly, in step S020, a check is made to find if the stop position in the step S019 is between the telephoto end and the extreme value P.

If the stop position of the first-lens-group tube 3 is found in step S020 to be between the extreme value P and the wide-angle end during the driving from the telephoto end to the wide-angle end, the biasing operation for eliminating backlash is unnecessary, as described above. However, if the stop position of the first-lens-group tube 3 is found in step S020 to be between the extreme value P and the telephoto end during the driving from the telephoto end to the wide-angle end, the biasing operation for eliminating backlash (the operation for eliminating hysteresis) is necessary, as described above, so that the flow proceeds to step S016.

In step S016, the biasing operation for eliminating hysteresis in the zoom driving from the telephoto end to the wide-angle end. Since the backlash of the gear train (39–45) exists on the side in the direction of drawing in the first-lens-group tube 3, the biasing operation is performed by driving the driving ring 37 toward the wide-angle side (in the drawing-in direction) from a target stop position extra as much as a predetermined amount to draw in the first-lens-group tube 3 and, after that, causing the zoom motor 38 to rotate in the normal direction and then stopping the first-lens-group tube 3 at the target stop position. Thus, as the stop position of the first-lens-group tube 3 obtained when the zoom switch 77 is turned off is stored, the first-lens-group tube 3 is made to be returned to the stop position as stored.

As a result, the backlash of the gear train (39–45) is eliminated, so that, even if an external force is exerted on the first-lens-group tube 3 in the drawing-in direction, the first-lens-group tube 3 is prevented from moving.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although, in the above-described embodiment, the extreme value in the zoom area (zoom locus) of the first-lens-group tube 3 is on the top of a locus which is protrusive toward the image side, the invention is applicable also to an arrangement in which the extreme value is on the top of a locus which is protrusive toward the object side, or to an arrangement in which the zoom locus is composed of a plurality of protrusive loci.

Further, in the above-described embodiment, a rear focus zoom lens is employed as an optical arrangement. However, the invention is applicable also to another zoom arrangement or to a focal-length changeover optical arrangement other than the zoom arrangement.

Further, in the above-described embodiment, an optical system composed of three lens groups is employed. However, the invention is applicable also to an optical system composed of a plurality of, other than three, lens groups, such as two or four lens groups.

Further, in the above-described embodiment, an optical arrangement is composed of a magnification-varying lens group and a focusing lens group. However, the invention is applicable also to an optical arrangement composed of other lens groups or to another optical unit arrangement including a filter or the like.

Further, the software arrangement and the hardware arrangement in the above-described embodiment may be adaptively replaced with each other.

Further, in the invention, the technical elements of the above-described embodiment may be combined with each other according to necessity.

Further, the invention also applies to cases where each claim or the whole or a part of the arrangement of the embodiment constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses, such as a lens barrel, other types of apparatuses, and, moreover, to apparatuses adapted for the cameras, the image pickup apparatuses, optical apparatuses and the other types of apparatuses, and elements constituting the above-mentioned apparatuses.

What is claimed is:

1. An apparatus comprising:

an optical unit a moving direction of which changes from one of a moving-out direction and a moving-in direction to the other of the moving-out direction and the moving-in direction in process of varying a focal length from one of a shortest focal length end side and a longest length end side to the other of the shortest focal length end side and the longest length end side, said optical unit having possibility of receiving an external force in the moving-in direction;

a driving device which drives said optical unit; and a control device which determines whether said optical unit moves in the moving-in direction to reach a stop position on the basis of a postion of said optical unit and a direction of varying the focal length, and causes said driving device to move said optical unit in the moving-out direction after moving the optical unit in the moving-in direction beyond the stop position and, then, to stop said optical unit at the stop position when said control device determines that optical unit moves in the moving-in direction to reach the stop position.

2. An apparatus according to claim 1, wherein said optical unit includes a lens.

3. An apparatus according to claim 1, wherein said driving device includes a motor.

4. An apparatus according to claim 1, further comprising:

an instruction device which gives an instruction for the direction of varying the focal length; and a position detector which detects the position of said optical unit, wherein said control device determines whether said optical unit moves in direction to reach the stop position, according to signals from said instruction device and said position detector.

5. An apparatus according to claim 1, further comprising:

an instruction device which gives an instruction for the direction of varying the focal length; and a determination device which determines a state of the focal length, wherein said control device determines whether said optical unit moves in the moving-in direction to reach the stop position, according to signals from said instruction device and said determination device.

6. An apparatus according to claim 1, wherein said apparatus includes a camera.

7. An apparatus according to claim 1, wherein said apparatus includes a lens barrel.

8. An apparatus according to claim 1, wherein said apparatus includes an optical apparatus.

9. An apparatus adapted for an optical unit a moving direction of which changes from one of a moving-out direction and a moving-in direction to the other of the moving-out direction and the moving-in direction in process of varying a focal length from one of a shortest focal length end side and a longest length end side to the other of the shortest focal length end side and the longest length end side, said optical unit having possibility of receiving an external force in the moving-in direction, and for a driving device which drives said optical unit, said apparatus comprising:

a control device which determines whether said optical unit moves in and the moving-in direction to reach a stop position on the basis of a position of said optical unit and a direction of varying focal length, and causes said driving device to move said optical unit in the moving-out direction after moving the optical unit in the moving-in direction beyond the stop position and, then, to stop said optical unit at the stop position when said control device determines that said optical unit moves in the moving-in direction to reach the stop position.

10. An apparatus according to claim 9, wherein said apparatus includes a camera.

11. An apparatus according to claim 9, wherein said apparatus includes a lens barrel.

12. An apparatus according to claim 9, wherein said apparatus includes an optical apparatus.

13. An apparatus comprising:

an optical unit which constitutes a foremost part of an optical system, a moving direction of said optical unit changing from one of a moving-out direction and a moving-in direction to the other of the moving-out direction and the moving-in direction in process of varying a focal length of said optical system from one of a shortest focal length end side and a longest length end side to the other of the shortest focal length end side and the longest length end side;

a driving device which drives said optical unit; and a control device which determines whether said optical unit moves in the moving-in direction to reach a stop position on the basis of a position of said optical unit and a direction of varying the focal length, and causes said driving device to move said optical unit in the moving-out direction after moving the optical unit in the moving-in direction beyond the stop position and, then, to stop said optical unit at the stop position when said control device determines that said optical unit moves in the moving-in direction to reach the stop position.

14. An apparatus according to claim 13, wherein said optical unit includes a lens.

15. An apparatus according to claim 13, wherein said driving device includes a motor.

16. An apparatus according to claim 13, further comprising:

an instruction device which gives an instruction for the direction of varying the focal length; and a position detector which detects the position of said optical unit, wherein said control device determines whether said optical unit moves in the moving-in direction to reach the stop position, according to signals from said instruction device and said position detector.

17. An apparatus according to claim 13, further comprising:

an instruction device which gives an instruction for the direction of varying the focal length; and a determination device which determines a state of the focal length, wherein said control device determines whether said optical unit moves in the moving-in direction to reach the stop position, according to signals from said instruction device and said determination device.

18. An apparatus according to claim 13, wherein said apparatus includes a camera.

19. An apparatus according to claim 13, wherein said apparatus includes a lens barrel.

20. An apparatus according to claim 13, wherein said apparatus includes an optical apparatus.

21. An apparatus adapted for an optical unit which constitutes a front most part of an optical system, a moving direction of said optical unit changing from one of a moving-out direction and a moving-in direction to the other of the moving-out direction and the moving-in direction in process of varying a focal length from one of a shortest focal length end side and a longest length end side, to the other of the shortest focal length end side and the longest length side end, and for a driving device which drives said optical unit, said apparatus comprising:

a control device which determines whether said optical unit move in the moving-in direction to reach a stop position on the basis of a position of said optical unit and a direction of varying the focal length, and causes said driving device to move said optical unit in the moving-out direction after moving the optical unit in the moving-in direction beyond the stop position and, then, to stop said optical unit at the stop position when said control device determines that said optical unit moves in the moving-in direction to reach the stop position.

22. An apparatus according to claim 21, wherein said apparatus includes a camera.

23. An apparatus according to claim 21, wherein said apparatus includes a lens barrel.

24. An apparatus according to claim 21, wherein said apparatus includes an optical apparatus.

25. An apparatus comprising:

an optical unit moving direction of which changes from one of a moving-out direction and a moving-in direction to the other of the moving-out direction and the moving-in direction in process of varying a focal length from one of a shortest focal length end side and longest length end side to the other of the shortest focal length end side and the longest length end side; and a control device which determines whether said optical unit moves in the moving-in direction to reach a stop position on the basis of a position of said optical unit and a direction of varying the focal length, and causes said driving device to move said optical unit in the moving-out direction after moving the optical unit in the moving-in direction beyond the stop position and, then, to stop said optical unit at the stop position when said control device determines that said optical unit moves in the moving-in direction to reach the stop postion.

26. An apparatus according to claim 25, further comprising:

an instruction device which gives an instruction for the direction of varying the focal length; and a position detector which detects the position of said optical unit, wherein said control device determines whether said optical unit moves in the moving-in direction to reach the stop position, according to signals from said instruction device and said position detector.

27. An apparatus according to claim 25, further comprising;

an instruction device which gives an instruction for the direction of varying the focal length; and a determination device which determines a state of focal length, wherein said control device determines whether said optical unit moves in the moving-in direction to reach the stop position, according to signals from said instruction device and said determination device.

28. An apparatus adapted for an optical unit a moving direction of which changes from one of a moving-out direction and a moving-in direction to the other of the moving-out direction and the moving-in direction in process of varying a focal length from one of a shortest focal length end side and a longest length end side to the other of the shortest focal length end side and the longest length end side, and for a driving device which drives said optical unit, said apparatus comprising:

a control device which determines whether said optical unit moves in the moving-in direction to reach a stop position on the basis of a position of said optical unit and a direction of varying the focal length, and causes said driving device to move said optical unit in the moving-out direction after moving the optical unit in the moving-in direction beyond the stop position and, then, to stop optical unit at the stop position when said control device determines that said optical unit moves in the moving-in direction to reach the stop position.

29. An apparatus comprising:

an optical unit a moving direction of which changes from one moving direction of a moving-out direction and a moving-in direction to the other moving direction of the moving-out direction and the moving-in direction in the process of varying a focal length from on of a shortest focal a length end side and a longest length end side to the other of the shortest focal length end side and the longest length end side;

a driving device which drive said optical unit; and a control device which determines the moving direction in which said optical unit reaches a stop postion on the basis of a position of said optical unit and a a direction of varying the focal length, and said driving device to move said optical unit in same direction to stop at the stop postion between the shortest focal length end side and the longest end side.

30. An apparatus according to claim 29, further comprising:

an instruction device which gives an instruction for the direction of varying the focal length; and a position detector which detects the position of said optical unit, wherein said control device determines whether said optical unit moves in the moving-in direction to reach the stop position, according to the signals from said instruction device and said position detector.

31. An apparatus according to claim 30, further comprising:

an instruction device which gives an instruction for the direction of varying the focal length, and a determination device which determines a state of focal length, wherein said control device determines whether said optical unit moves in the moving in the moving-in direction to reach the stop position, according to signals from said instruction device and said determination device.

32. An apparatus adapted for an optical unit a moving direction of which changes from one moving direction of a moving-out direction and a moving-in direction to the other moving direction of the moving-out direction and the moving-in direction in process of varying a focal length from one of a shortest focal length end side and a longest length end side to the other of the shortest focal length end side and the longest length end side, and for a driving device which drives said optical unit, said apparatus comprising:

a control device which determines the moving direction in which said optical unit reaches a stop position on the basis of a position of said optical unit and a direction of varying the focal length, and causes said driving device to move said optical unit in same direction to stop at the stop position between the shortest focal length end side and the longest length end side.

* * * * *

UNITED STATES PATENT AND TRADEMARK OFFICE
CERTIFICATE OF CORRECTION

PATENT NO.     : 6,324,343 B1
DATED          : November 27, 2001
INVENTOR(S)    : Toshiyuki Yasuda It is certified that error appears in the above-identified patent and that said Letters Patent is hereby corrected as shown below:

Column 12,
Line 1, delete "moves in direction" and insert -- moves in the moving-in direction --.

Column 13,
Line 65, delete "move" and insert -- moves --.

Column 15,
Line 4, delete "stop optical" and insert -- stop said optical --
Line 12, delete "from on of a" and insert -- from one of a --.
Line 20, delete "and a a" and insert -- and a --.

Signed and Sealed this

Nineteenth Day of November, 2002

Attest:

JAMES E. ROGAN
Attesting Officer       Director of the United States Patent and Trademark Office